(12) United States Patent
Keyser

(10) Patent No.: US 8,911,918 B2
(45) Date of Patent: Dec. 16, 2014

(54) HYBRID SEAL APPLICATION PROCESS

(75) Inventor: Mark W. Keyser, Bloomfield, NY (US)

(73) Assignee: GM Global Technology Operations LLC, Detroit, MI (US)

(*) Notice: Subject to any disclaimer, the term of this patent is extended or adjusted under 35 U.S.C. 154(b) by 666 days.

(21) Appl. No.: 12/701,974

(22) Filed: Feb. 8, 2010

(65) Prior Publication Data

US 2011/0195346 A1    Aug. 11, 2011

(51) Int. Cl.
| | | |
|---|---|---|
| *B05D 5/00* | (2006.01) | |
| *H01M 8/02* | (2006.01) | |
| *H01M 8/24* | (2006.01) | |
| H01M 2/08 | (2006.01) | |
| B05D 5/12 | (2006.01) | |
| H01M 8/10 | (2006.01) | |

(52) U.S. Cl.
CPC .............. *H01M 8/0286* (2013.01); *H01M 8/02* (2013.01); *B05D 5/12* (2013.01); *H01M 8/0206* (2013.01); *H01M 8/0267* (2013.01); *H01M 8/0297* (2013.01); *H01M 8/247* (2013.01); H01M 2008/1095 (2013.01); Y02E 60/50 (2013.01)
USPC ........... 429/516; 427/115; 427/282; 427/302; 427/331; 429/115; 429/507; 429/509; 429/510; 429/535; 429/59; 29/623.2

(58) Field of Classification Search
CPC ............ B05D 1/26; B05D 1/265; B05D 1/32; B05D 1/322; B05D 1/36; H01M 2/145; H01M 2/08; H01M 2/0286; H01M 2/0276; H01M 8/002
USPC ........ 427/208, 115, 294, 372.2, 472.1, 427.3, 427/427.4, 282, 302, 331, 37.2; 264/643, 264/212; 429/512, 535, 469, 34, 35, 36, 39, 429/45, 115, 507, 509, 510, 59; 29/623.2
See application file for complete search history.

(56) References Cited

U.S. PATENT DOCUMENTS

| | | | | |
|---|---|---|---|---|
| 3,023,466 | A * | 3/1962 | Landis | ........................ 49/479.1 |
| 2003/0194597 | A1* | 10/2003 | Ganski et al. | .................... 429/38 |
| 2005/0087907 | A1* | 4/2005 | Hanai et al. | ................... 264/252 |
| 2008/0038620 | A1* | 2/2008 | Stelter | ............................. 429/35 |

FOREIGN PATENT DOCUMENTS

| | | |
|---|---|---|
| CN | 1635643 A | 7/2005 |
| CN | 1815783 A | 8/2006 |
| DE | 102007023544 A1 | 11/2007 |
| DE | 102010049549 A1 | 4/2012 |

OTHER PUBLICATIONS

Koch, 2005, Freudenber-Nok General Partnership, "Pem Fuel Stack Sealing".*

* cited by examiner

Primary Examiner — Allison Fitzsimmons
(74) Attorney, Agent, or Firm — Fraser Clemens Martin & Miller LLC; J. Douglas Miller

(57) ABSTRACT

A method for creating a formed-in-place seal on a fuel cell plate is disclosed. The method includes first dispensing a flowable seal material along a first sealing area of a fuel cell plate requiring the seal material. Next, a preformed template is located adjacent to at least a portion of the fuel cell plate, the template including predetermined apertures corresponding with a second sealing area of the plate, such that the apertures are coextensive with at least a portion of the first sealing area. Flowable seal material is applied into the apertures, and is then cured to a non-flowable state.

16 Claims, 4 Drawing Sheets

HYBRID SEAL APPLICATION PROCESS

FIELD OF THE INVENTION

The invention relates to a fuel cell system and more particularly to a method for producing a formed-in-place seal for sealing between plates of the fuel cell system.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. Pat. No. 7,459,227, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

A common type of fuel cell is known as a proton exchange membrane (PEM) fuel cell. The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane-electrode-assembly (MEA). The MEA is disposed between porous diffusion media (DM). The DM facilitates a delivery of gaseous reactants, typically the hydrogen and the oxygen from air, to an active region defined by the MEA for an electrochemical fuel cell reaction. Nonconductive gaskets electrically insulate the various components of the fuel cell.

When the MEA and the DM are laminated together as a unit, for example, with other components such as gaskets and the like, the assembly is typically referred to as a unitized electrode assembly (UEA). The UEA is disposed between fuel cell plates, which act as current collectors for the fuel cell. The UEA components disposed between the fuel cell plates are typically called "softgoods". The typical fuel cell plate has a feed region that uniformly distributes the gaseous reactants to and between the fuel cells of the fuel cell stack. The feed region may have a broad span that facilitates a joining of the fuel cell plates, e.g., by welding, and a shifting of flows between different elevations within the jointed plates. The feed region includes supply ports that distribute the gaseous reactants from a supply manifold to the active region of the fuel cell via a flow field formed in the fuel cell plate. The feed region also includes exhaust ports that direct the residual gaseous reactants and products from the flow field to an exhaust manifold.

The stack, which can contain more than one hundred plates, is compressed, and the elements held together by bolts through corners of the stack and anchored to frames at the ends of the stack. In order to militate against undesirable leakage of fluids from between the plate assemblies, a seal is often used. The seal is disposed along a peripheral edge of the plate assemblies and selected areas of the flow paths formed in the plates.

When the sealing surfaces are uniformly flat and parallel, conventional seals may be employed between plates. One prior art solution involves separate three-dimensional engineered seals specifically shaped to conform to contoured surfaces. Such three-dimensional seals may be all metal, all elastomeric, or a combination thereof. However, these prior art seals may be prohibitively expensive. Additionally, these seals are sensitive to dimensional and environmental variation, which makes use thereof undesirable for full scale production. Engineered seals also require highly accurate placement during a production step. Since such engineered seals are not adhered to one of the plates, the seal may migrate prior to compression and anchoring in place, adversely affecting the sealability. To avoid migration, a metal shim or foil may be added to sandwich and sufficiently support the engineered seal against deflection. However, the use of metal shims is undesirable since the shims must have a strength and thickness that resists deflection of the seal under pressure. The shim must also be sufficiently bonded to the seal to inhibit separation therefrom over repeated fuel cell operation. Thus, the employment of metal shims undesirably adds to a complexity and cost of the fuel cell.

Newer elastomeric seal materials make it possible to directly dispense a flowable sealant onto one of the plates, generally through an automatically controlled nozzle. However, the geometry of the fuel cell plates requires that the fluids being sealed follow a tortuous flow path through the fuel cell. The tortuous flow path typically includes open areas which reduce a velocity of the flow of the fluids, as well as reduced area flow paths created by surface features of each plate, thereby introducing three dimensional surfaces to be sealed. Such surface features also introduce areas to be sealed having varying thicknesses, thereby requiring dispensing non-uniform thicknesses of sealing material. Additionally, control of dispensing nozzles moving in three dimensions is difficult and costly, and the process of depositing the seal solely via dispensing nozzles is time-consuming, and is limited by the flowability of the sealant material. At higher linear speeds, the sealant exhibits undesirable undulations and pulling, reducing the deposition thickness. Because the dispensing speed must be limited, and because of the complex three-dimensional surface features on the fuel cell plate perimeter, the dispensing process requires an unacceptably long time period to accomplish, during which the uncured sealant is unnecessarily exposed to contamination. Also, because the sealant has some amount of flowability when in an uncured state, a longer elapsed time during sealant application may result in the sealant undesirably moving or changing shape prior to cure, again adversely affecting the seal integrity.

Further, because the sealing beads follow complex paths about the plates along a sealing surface, it is not possible to dispense the sealant as a single, continuous bead. Instead, multiple, discontinuous beads of sealant must be arranged to minimize the effects of breaks, knit lines, intersections and/or overlaps of the beads. Breaks between sealant beads reduce the integrity of the seal, while knits, intersections and overlaps of the beads may result in a wasteful surplus of sealant applied at a given location that also may adversely affect either the seal itself or the performance of the fuel cell stack, or both.

Therefore, it is desirable to obtain a formed-in-place seal assembly, and a method for its application, for sealing between plates of a fuel cell system, wherein the seal assembly and its manufacture militates against a leakage of fluids from the fuel cell system, facilitates a maintenance of a desired velocity of the fluid flow in the fuel cell system, and further addresses each of the aforesaid difficulties.

SUMMARY OF THE INVENTION

In accordance with the present invention, a method for creating a seal assembly for sealing between plates of a fuel cell system, wherein the seal assembly structure militates against a leakage of fluids from the fuel cell system, facilitates a maintenance of a desired velocity of the fluid flow in the fuel cell system, and provides several advantages, has surprisingly been discovered.

The method comprises the steps of dispensing a flowable seal material along a perimeter seal of a fuel cell plate requiring the seal material; locating a preformed template adjacent to at least a portion of the plate, the template including predetermined apertures corresponding with a second sealing area of the plate, the apertures coextensive with at least some of the dispensed seal material; dispensing the flowable seal material into the apertures; and curing the flowable seal material to a non-flowable state.

In one embodiment of the method, the dispensing step occurs substantially linearly along a single axis onto substantially flat portions of the fuel cell plate.

In another embodiment of the method, the preformed template includes apertures corresponding with a complex seal area of the plate requiring non-linear seal material deposition. More preferably, the apertures corresponding to and defining the complex seal area also include varying depth for receiving varying thicknesses of seal material, thus defining a third dimension for controlling application of the flowable seal material. The outer perimeter of the varying depth apertures may be defined by and include surface features formed on the underside of the template, where the template surface features matingly engage with corresponding surface features on the fuel cell plate to properly locate the template during seal material application.

In still another embodiment, a plate for a fuel cell comprises a plate with a first surface, a second surface, and a plurality of header openings formed therein; a flow field formed on the first surface of the plate, the flow field including an inlet region and an outlet region, the inlet region and the outlet region having feed area channels to provide fluid communication with at least one header opening; and at least one elongated formed-in-place sealing member formed on the plate adapted to cooperate with an adjacent fuel cell plate to form a substantially fluid tight seal therebetween, the seal formed of seal material deposited directly on the plate using a combination of a linear dispensing process and application using a template.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
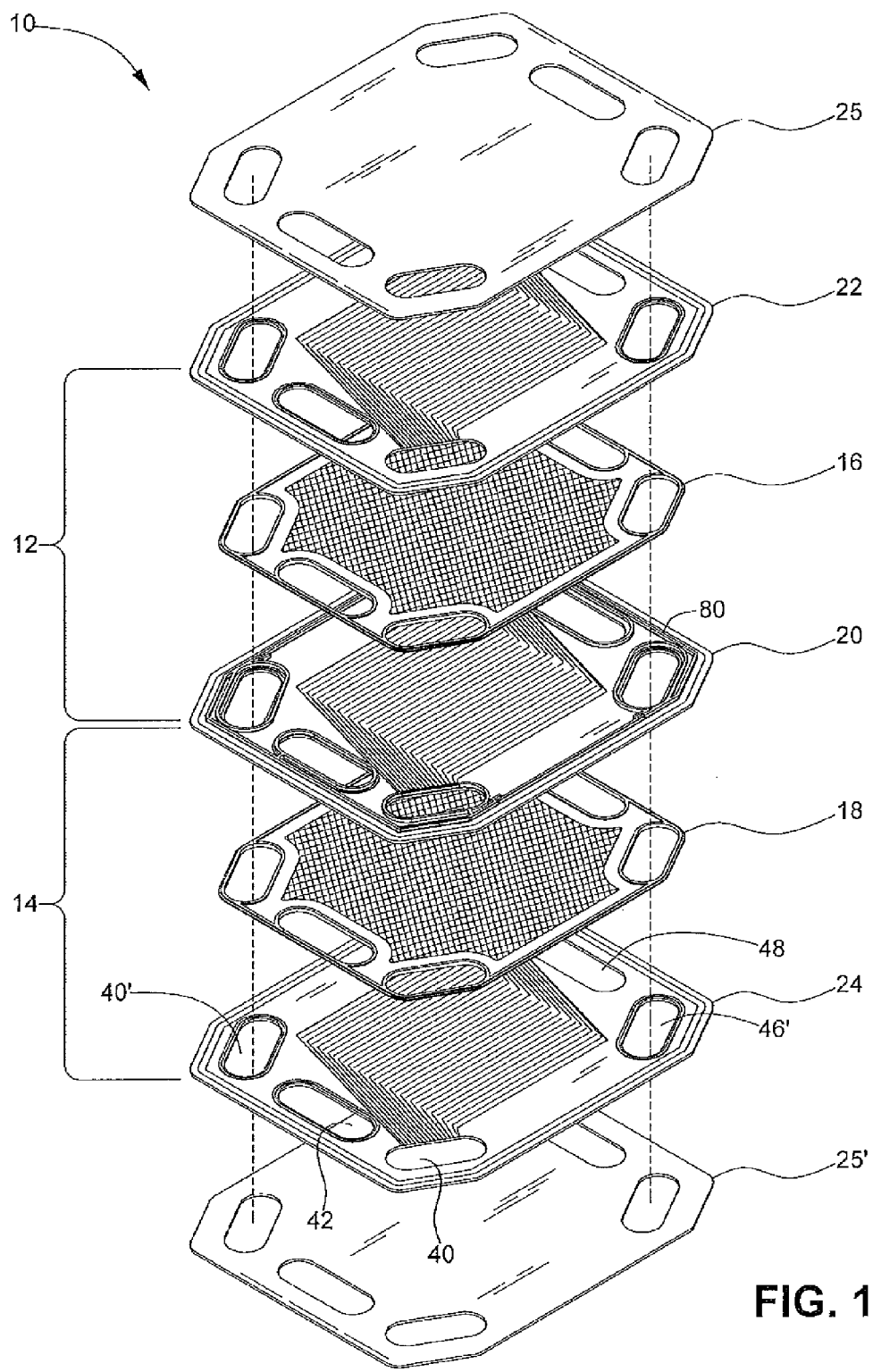
FIG. 1 is an exploded perspective view of a proton exchange membrane fuel cell stack according to an embodiment of the invention.

FIG. 1 is a proton exchange membrane (PEM) fuel cell stack 10 having two electricity producing cells 12 and 14. Although a bipolar PEM fuel cell stack is shown, it is understood that other fuel cell types and configurations can be used without departing from the scope and spirit of the invention. It is also understood that fuel cell stacks having more cells and plates can be and typically are used.

The fuel cell stack 10 includes a first a unitized electrode assembly (UEA) 16 and a second a UEA 18. The UEA's 16, 18 include a membrane-electrode-assembly (MEA) (not shown) disposed between porous diffusion media (DM) (not shown). It should be understood that the MEA and the DM can be separate components rather than being combined to form the UEA. The UEA's 16, 18 are disposed between fuel cell plates, which act as current collectors for the fuel cell. An electrically conductive, liquid-cooled, bipolar plate assembly 20 is disposed between the first UEA 16 and the second UEA 18. The first UEA 16, the second UEA 18, and the bipolar plate assembly 20 are stacked together between monopolar end plate assemblies 22, 24. In the illustrated embodiment, the monopolar end plate assemblies 22, 24 are bipolar plate assemblies adapted to function as monopolar end plate assemblies. Electrically conductive adapter plates 25, 25' are provided to cooperate with a bipolar plate that is identical to bipolar plate 20 to form each of the monopolar end plate assemblies 22, 24. It should be understood that end plates specifically adapted to function as end plates may also be employed.

Figure 2:
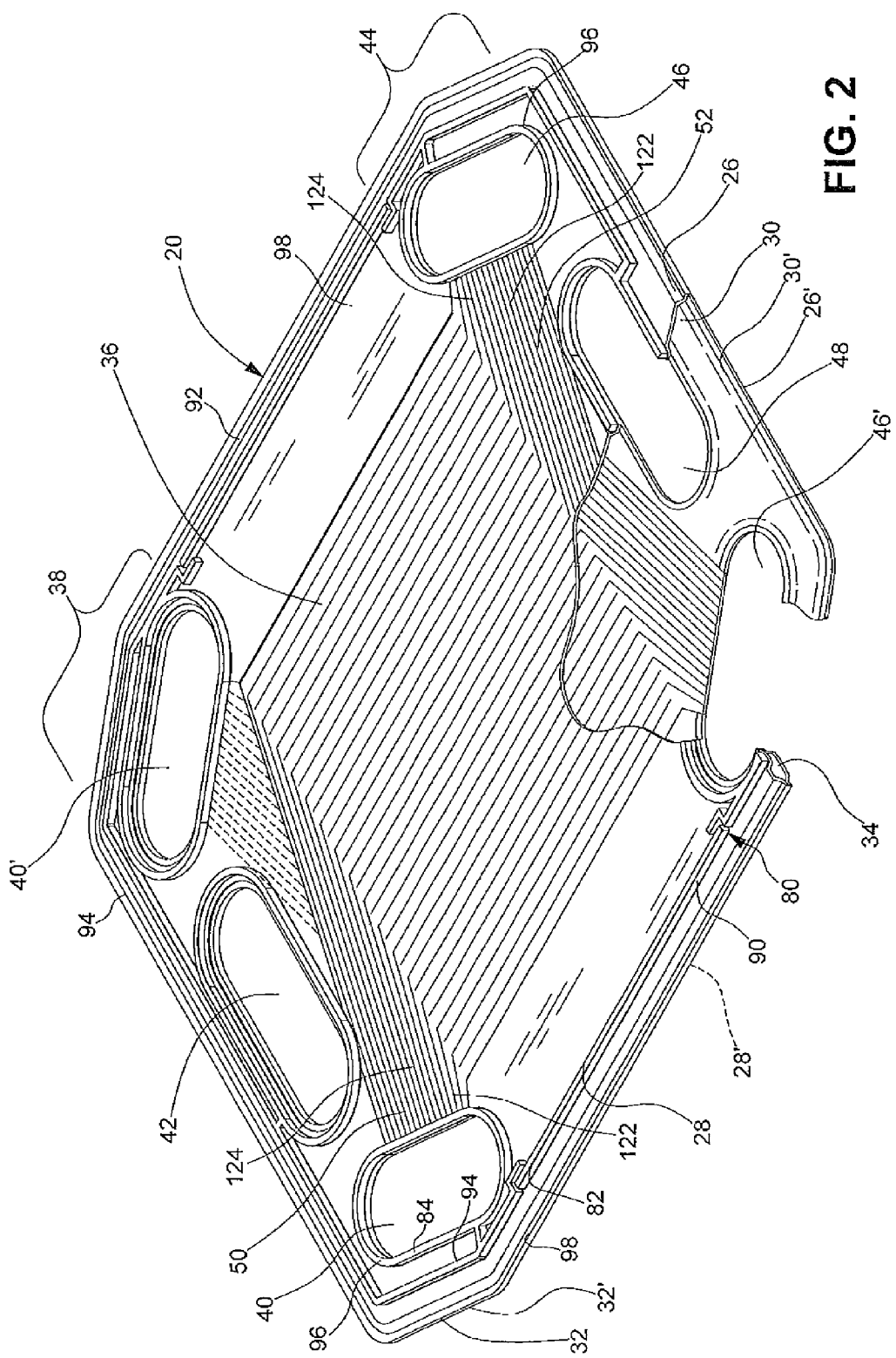
FIG. 2 is a fragmentary perspective view of a fuel cell plate of the fuel cell stack shown in FIG. 1.

The bipolar plate assembly 20 is formed from a pair of plates 26, 26', more clearly illustrated in FIG. 2. Each plate 26, 26' has a first surface 28, 28', a second surface 30, 30' and an outer peripheral edge 32, 32'. The second surfaces 30, 30' of the plates 26, 26' are bonded together in vertical alignment to form a coolant channels 34 therebetween. The plates 26, 26' can be bonded by various means such as welding or an application of an adhesive, for example. The plates 26, 26' are typically formed from a planar metal sheet by a stamping operation, although other methods can be used as desired.

Each plate 26, 26' includes a flow field 36 formed on the first surface 28, 28', respectively. FIG. 2 shows the flow field 36 formed in the plate 26. It should be understood that the plate 26' includes a flow field on the first surface 28' having the same structural aspects as the flow field 36 formed on the first surface 28 of the plate 26. The flow field 36 distributes a fuel and an oxidant gas to the cells 12, 14 over the respective faces of the UEA's 16, 18. The plates 26, 26' include header openings 40, 40' formed therein to provide an inlet for the hydrogen and the oxygen to the cells 12, 14. Feed area channels 50 are formed in the inlet region 38 to provide fluid communication between the header opening 40 and the flow field 36. Additionally, a header opening 42 is formed in the plates 26, 26' to provide an inlet for the coolant to the channel 34. The plates 26, 26' include header openings 46, 46' formed therein to provide an outlet for the hydrogen and the oxygen from the cells 12, 14. Feed area channels 52 are formed in the outlet region 44 to provide fluid communication between the header opening 46 and the flow field 36. Additionally, a header opening 48 is formed in the plates 26, 26' to provide an outlet for the coolant from the channel 34.

Flow channels (not shown) may be formed in the plates 26, 26' to provide fluid communication with the coolant channel 34 and the respective header openings 42, 48. Alternatively, apertures (not shown) may be formed in the plates 26, 26' adjacent the header openings 42, 48 to provide fluid communication with the coolant channel 34 and the respective header openings 42, 48. It should be understood that both the flow channels and the apertures may be formed in the plates 26, 26' to provide fluid communication between the coolant channel 34 and the respective header opening 42, 48.

Each of the plate assemblies 20, 22, 24 includes at least one perimeter seal formed as an elongate protuberance on at least one of the external surfaces thereof. For clarity, only one perimeter seal 80 will be discussed with reference to FIG. 2 as applied to bipolar plate assembly 20, and to at least one of plates 26, 26' that comprise bipolar plate assembly 20. It should be understood that the perimeter seal 80 may be applied to any or all plates and plate assemblies of the fuel cell stack 10.

The perimeter seal 80 includes an outer perimeter portion 82 that substantially circumscribes the outer peripheral edge 32 of the plate 26. The perimeter seal 80 also includes inner portions 84 adjacent and circumscribing at least one of the header openings 40, 40', 42, 46, 46', 48. In one embodiment, the inner seal portion 84 circumscribes all of the aforementioned header openings 40, 40', 42, 46, 46', 48.

It is understood that the header openings 40, 40', 42, 46, 46' and 48 may be any desired cross-sectional configuration as required for the efficient operation of the fuel cell, although the various header openings 40, 40', 42, 46, 46', 48 are shown in FIG. 2 as substantially oval in cross-section. Likewise, the outer peripheral edges 32, 32' of the plates 26, 26' may be any desired cross-sectional configuration. As a result, the shape of the perimeter seal 80, including the outer perimeter portion 82 and the inner portion 84, depends on the cross-section and shape of the overall fuel cell, including that of the plate assembly 22 and the respective header openings 40, 40', 42, 46, 46', 48. As the peripheral shape of the plates 26, 26' and the header openings 40, 40', 42, 46, 46', 48 become more complex, it becomes less efficient to create the perimeter seal 80 as a separately formed engineered seal, and it becomes more difficult to properly and accurately locate the perimeter seal 80 on the plates 26, 26' during the manufacturing process.

The present invention utilizes a formed in place seal as part of the manufacturing process to directly and accurately place the material forming the perimeter seal 80 where desired. Typically, such formed in place seals are applied as a viscous liquid that later undergoes a curing process. The curing process may be heat, application of ultraviolet light, or any other suitable curing process.

In normal application, the viscous seal material is applied via a dispensing nozzle or other application tip. Additionally, as may be seen in FIG. 2, the geometry of the plate assembly 22, especially the feed area channels 50, 52, requires that the fluids being sealed follow a tortuous flow path through the fuel cell. The tortuous flow path typically includes open areas which reduce a velocity of the flow of the fluids, as well as reduced area flow paths created by surface features 122, 124 of each plate, thereby introducing three dimensional surfaces to be sealed. The surface features 122, 124 also introduce areas to be sealed having varying thicknesses, thereby requiring dispensing non-uniform thicknesses of sealing material, especially circumscribing the manifolds 40, 46. Control of dispensing nozzles moving along multiple axes is both difficult and costly, and the process of depositing the seal solely via dispensing nozzles is time-consuming, and is limited by the flowability of the seal material. At higher linear speeds (e.g. greater than 20 millimeters per second for 0.1 to 0.2 millimeter wide beads), the sealant exhibits undesirable undulations and pulling, reducing the deposition thickness and seal quality. Slowing the dispensing process leads to an unacceptably long time period to apply the sealant material, during which the uncured sealant is unnecessarily exposed to contamination, or to premature drying, or to deformation due to the uncured seal material moving, slumping or changing shape prior to cure. It has been determined that the minimum time necessary to dispense sealing material solely using dispensing nozzles is approximately 45 seconds per plate.

Moreover, because the perimeter seal 80 follows a complex, multi-axis path about the plate 26 along a sealing surface, it is not feasible to dispense the sealant as a single, continuous bead. Instead, multiple, discontinuous beads of sealant must be arranged to minimize the effects of seal thickness, breaks, knit lines, intersections and/or overlaps of the beads, especially in the vicinity of the header openings 40, 40', 42, 46, 46', 48. Breaks between sealant beads reduce the integrity of the seal, while knits, intersections and overlaps of the beads may result in a wasteful surplus of sealant applied at a given location that also may adversely affect either the seal itself or the performance of the fuel cell stack, or both.

It has been determined that the perimeter seal 80 includes substantially linear sections 90, 92, that interlace with non-linear (or corner) sections 94. Additionally, the perimeter seal 80 includes complex sections 96 circumscribing the header openings 40, 40', 42, 46, 46', 48, which may or may not overlap, interlace or connect to corner sections 94, as dictated by the sealing geometry. The complex sections 96 also must seal the feed area channels 50, 52 adjacent the header openings 40, 46, respectively. The feed area channels 50, 52 present three dimensional sealing surfaces, wherein the area between adjacent surface features 122, 124 requires more sealant material to fill any gaps or channels therebetween. Thus, a dispensing operation would require dispensing nozzles to move along at least two axes, in the case of the corner section 94, or even along three axes, in the case of the complex sections 96. Such multi-axis control of a dispensing nozzle is both difficult and expensive. Additionally, connecting the sealant material of the corner section 94 with the complex sections 96, and further connecting to the linear sections 90, 92, would result in an unacceptably large number of knits, intersections and overlaps of the beads, both wasting sealant material and potentially adversely affecting the integrity of the perimeter seal 80.

Figure 4:
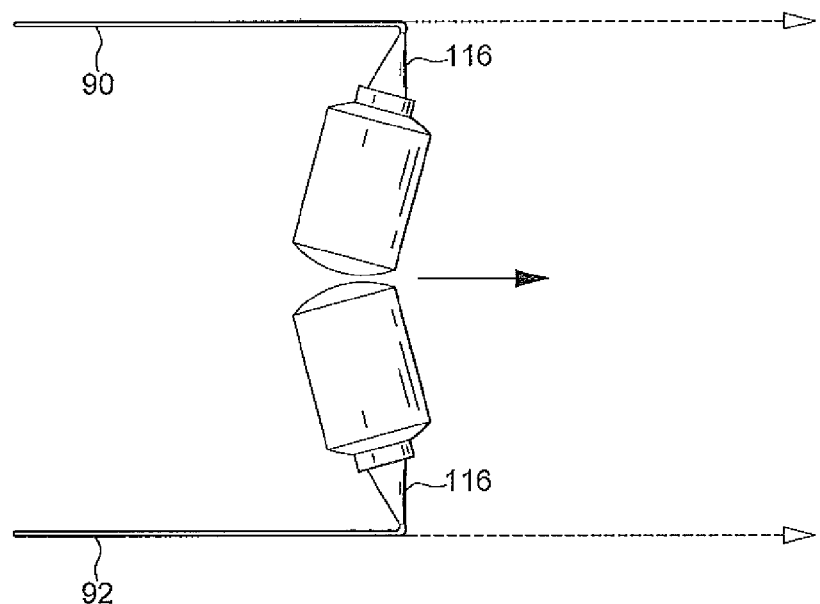
FIG. 4 is a schematic view of a first portion of a seal applied using a method of the present invention.

In the present invention, the linear sections 90, 92 are applied to the perimeter of the plate 26 using the dispensing nozzles 116 moving generally along a single axis, as shown in FIG. 4. Since the sealing surface 98 adjacent the outer peripheral edge 32 beneath the linear seal sections 90, 92 is essentially featureless, the sealant material may be applied at a generally constant velocity and application rate. Further, since the straight sections 90, 92 are generally parallel to each other, the linear sections 90, 92 may be applied substantially simultaneously by parallel dispensing nozzles 116 moving along a single axis in a single direction at substantially a constant speed, thus taking advantage of accurate and quick application.

Figure 3:
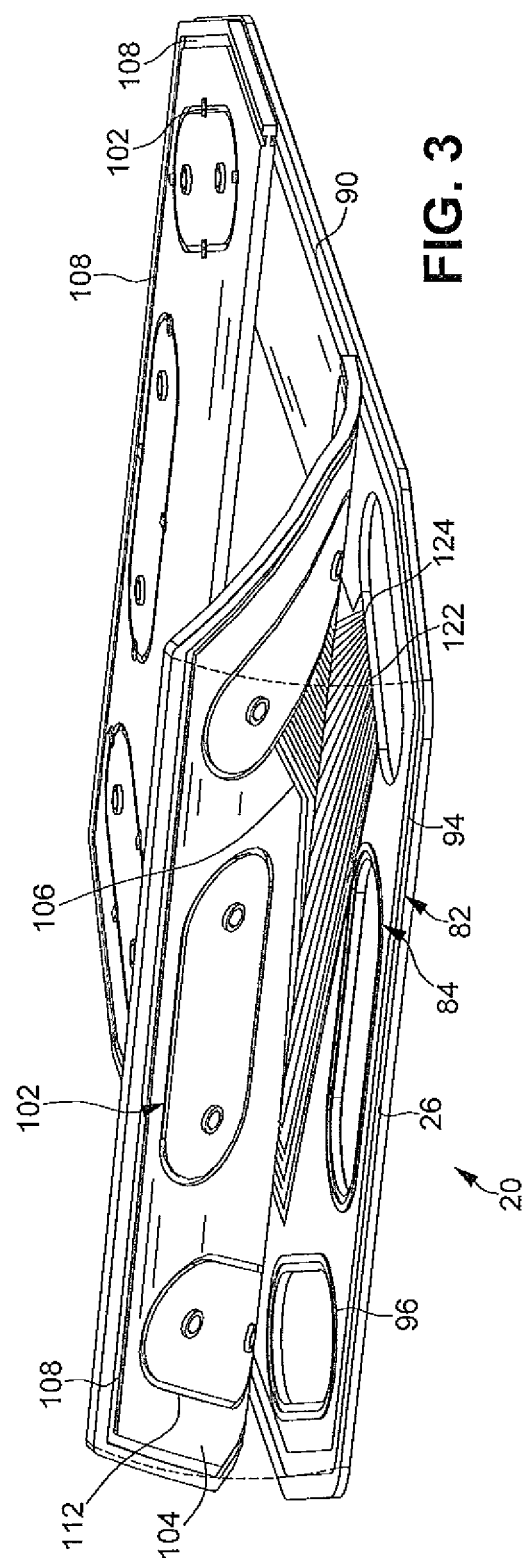
FIG. 3 is a perspective view of a fuel cell plate and corresponding template according to an embodiment of the invention.

The non-linear sections 94 and the complex sections 96 are applied by placing a template or stencil 100 over the areas to be sealed and applying sealing material to apertures 102 in the template, as shown in FIG. 3. The underside surface 104 of the template 100 includes surface features 106 designed to matingly engage with surface features 122, 124 formed on the plate 20. The surface features 106 of the template 100 also assist in properly locating the template 100 accurately on the surface of the plate 26. By combining single-axis dispensing nozzles with a multi-axis template, an economical, non-wasteful and fast perimeter seal 80 may be accurately deposited on the fuel cell plate 20.

Figure 5:
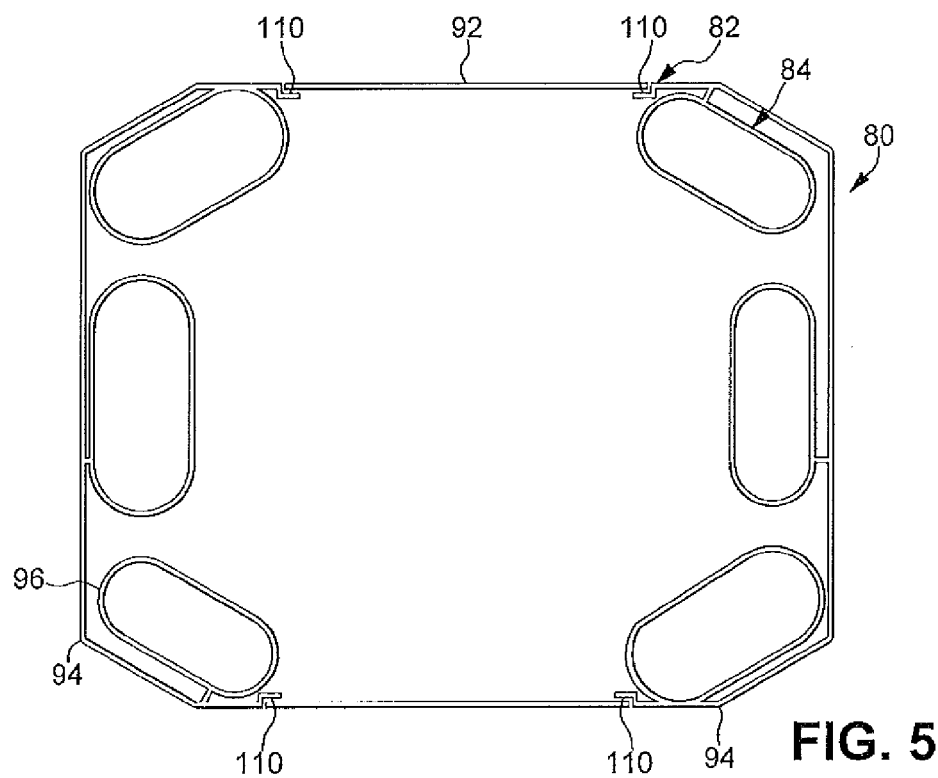
FIG. 5 is a top plan view of a seal only as applied to a fuel cell plate using a method of the present invention.

The template 100 includes elongate apertures 108 for receiving sealing material. The sealing material may be applied in to the apertures 102, 108 in conventional ways, including with a squeegee or injection process, for example. The apertures 108 are positioned at locations corresponding to the non-linear sections 94 and the complex sections 96 of the perimeter seal 80, and may correspond to either the outer perimeter portions 82 or to the inner perimeter portions 84, or both. When the sealing material is applied to fill the apertures 102, 108, the sealing material is deposited on the surface of the plate 26 such that it circumscribes the header openings 40, 40', 42, 46, 46', 48 and, if necessary, also completes the seal about the periphery of the plate 26 along the corner sections 94, or where desired. Once the seal material is applied, an overlapping interface 110, as shown in FIG. 5, may be present at a limited number of predetermined locations along the perimeter seal 80 to interlace the seal of linear section 90 with non-linear section 94. No additional overlaps should be necessary to achieve a complete perimeter seal. Limiting overlaps increases the integrity of the perimeter seal 80 while eliminating wasteful application of seal material. Further, by applying the linear sections 90, 92 with the dispensing nozzles 116, and then applying the sealant material at locations corresponding to the non-linear sections 94 and the complex sections 96 of the perimeter seal 80, a significant number of knits, intersections and overlaps of the beads are completely avoided, conserving sealant material and ensuring the integrity of the perimeter seal 80.

The inner surfaces 112 that define the apertures 102, 108 are treated or formed in such a way that uncured sealing material does not adhere to the template 100, thereby allowing the sealing material to remain in place on the plate 26 once the template is removed. The inner surfaces 112 within the apertures 102, 108 may also be formed to impart a particular cross-sectional geometry or bead shape to the applied seal, as desired, and act as a barrier to prevent axial flow of the seal material during application thereof, thus ensuring limited and accurate deposition of the seal material onto the fuel cell plate 20.

The surface features 106 of the template 100, when matingly engaged with corresponding surface features 122, 124 of the plate 26, create a variable depth aperture necessary to allow for more sealant material to fill any gaps or channels (e.g. the flow fields 50, 52) in the surface of the plate 26 to prevent leakage of fluid therefrom. Thus, the surface features 106 of the template 100 may be designed to accommodate any required three-dimensional aspects of the sealing surface.

It has further been found that a combination of the dispensing nozzles 116 and the template 100 is superior to a method that relies solely on a large template to deposit sealant material to form the entirety of perimeter seal 80. First, such a large template would have to be at least coextensive in size to the plate 26, making it difficult to manipulate. Second, the sealant material would have to be applied to a large surface area on an outer surface of the large template to fill in any apertures therein. Application of sealant material to the large outer surface of a large template is a wasteful application of sealant material. Additionally, the large surface area of uncured sealant on the outer surface of the large template is subject to contamination and premature curing or drying of the material, which may lead to inadequate application of the perimeter seal 80 during a manufacturing process.

In one preferred application method, the seal material is dispensed first generally along a first axis corresponding to the linear sections 90, 92 by parallel dispensing nozzles 116 moving at a substantially constant velocity and at a substantially constant application rate. The dispensing may occur simultaneously to each of the linear sections 90, 92, as shown in FIG. 4. Shortly thereafter, and prior to the curing process, the template 100 is placed adjacent the plate 26 such that the surface features 106 of the template 100 matingly engage the surface features 122, 124 of plate 26. Such mating engagement ensures proper location of the template 100, and as a result, ensures proper application of the perimeter seal 80. The seal material is applied to the apertures 102, 108 in the template 100 in such a way as to fill the apertures 102, 108 with sealing material, without voids or imperfections. Any method may be used to apply the sealing material to the template apertures. However, a squeegee or other wiping application of the seal material has been found to minimize the surface area of uncured sealing material present on the outer surface 114 of the template 100 during the application process. Minimizing the surface area of the applied sealing material also minimizes the potential for contamination of the sealing material prior to cure.

Once the sealing material has been properly applied to fill the apertures 102, 108 of the template 100, the template 100 is removed and the entire formed in place seal undergoes an appropriate curing process. It should be noted that the curing process need not require removal of the template. However, it has been found that the template does not need to remain in place during the curing process.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for creating a formed-in-place seal on a fuel cell plate, comprising:

first, dispensing a flowable seal material on a first sealing area of a fuel cell plate requiring the seal material;

second, locating a preformed multi-axis template on at least a portion of a surface of the fuel cell plate, the multi-axis template including apertures corresponding with a second sealing area of the surface of the fuel cell plate, wherein the apertures correspond to and define at least a non-linear seal area of the fuel cell plate, and wherein a cross-section of the apertures at a top surface of the template corresponds to a cross-section of the apertures at an underside surface of the template, the apertures coextensive with at least a portion of the first sealing area;

applying the flowable seal material in the apertures to the surface of the fuel cell plate; and curing the flowable seal material to a non-flowable state.

2. The method of claim 1, wherein the dispensing step occurs substantially linearly along a single axis onto substantially flat portions of the fuel cell plate.

3. The method of claim 2, wherein the non-linear seal area circumscribes at least one header opening in the fuel cell plate.

4. The method of claim 2, wherein the second sealing area corresponds to non-linear portions of the fuel cell plate sealing area.

5. The method of claim 4, wherein the second sealing area further corresponds to portions of the fuel cell plate having three dimensional surface features.

6. The method of claim 5, wherein the template further includes surface features that matingly engage the fuel cell plate three dimensional surface features for positioning the template during the applying step.

7. The method of claim 6, wherein at least a portion of the template underside surface defines a barrier against axial flow of the seal material.

8. A method for creating a formed-in-place seal on a fuel cell plate, comprising:

first, dispensing from a nozzle a flowable seal material on a first sealing area of a fuel cell plate requiring the seal material;

second, placing a preformed multi-axis template on a surface of the fuel cell plate, wherein the multi-axis template includes apertures defining a second sealing area of the surface of the fuel cell plate, wherein the apertures correspond to and define at least a non-linear seal area of the fuel cell plate, and wherein a cross-section of the apertures at a top surface of the template corresponds to a cross-section of the apertures at an underside surface of the template, the apertures coextensive with at least a portion of the first sealing area;

applying the flowable seal material in the apertures to the surface of the fuel cell plate; and curing the flowable seal material to a non-flowable state.

9. The method of claim 8, wherein the dispensing step occurs substantially linearly along a single axis onto substantially flat portions of the fuel cell plate.

10. The method of claim 9, wherein the first sealing area is substantially flat.

11. The method of claim 8, wherein the second sealing area lies along at least two axes of the fuel cell plate.

12. The method of claim 8, wherein at least a portion of the first sealing area and the second sealing area overlap to form an interlaced continuous seal.

13. The method of claim 8, wherein the second sealing area further corresponds to portions of the fuel cell plate having three dimensional surface features.

14. The method of claim 13, wherein the template further includes surface features that matingly engage the fuel cell plate three dimensional surface features for positioning the template during the applying step.

15. The method of claim 14, wherein at least a portion of the template underside surface defines a barrier against axial flow of the seal material.

16. The method of claim 1, wherein the applying step includes applying the flowable seal material with one of a squeegee and an injection process.

* * * * *